United States Patent
Hill et al.

(10) Patent No.: US 7,343,321 B1
(45) Date of Patent: Mar. 11, 2008

(54) METHOD OF ADMINISTERING LICENSING OF USE OF COPYRIGHT WORKS

(76) Inventors: Keith Ryan Hill, 7 Fenstanton Avenue, North Finchley, London, N12 9HA (GB); Michael Anthony Hayes, Whitefriars Cottage, Hosey Hill, Westerham, Kent TN16, 1TA (GB); Peter Harrison, 4 Manor Court, 1 Manor Drive, Surbiton, Surrey, KT5 8NE (GB)

( * ) Notice: Subject to any disclaimer, the term of this patent is extended or adjusted under 35 U.S.C. 154(b) by 0 days.

(21) Appl. No.: 09/387,930

(22) Filed: Sep. 1, 1999

(51) Int. Cl.
    *G06F 30/00* (2006.01)
(52) U.S. Cl. .......................................... 705/26; 705/27
(58) Field of Classification Search ................. 705/26, 705/27
    See application file for complete search history.

(56) References Cited

U.S. PATENT DOCUMENTS

| | | | | |
|---|---|---|---|---|
| 5,553,143 | A | 9/1996 | Ross et al. | 705/59 |
| 5,675,734 | A | 10/1997 | Hair | 395/200.01 |
| 5,679,911 | A | 10/1997 | Moriyama et al. | 84/601 |
| 5,765,152 | A | 6/1998 | Erickson | 707/9 |
| 5,809,144 | A * | 9/1998 | Sirbu et al. | 380/25 |
| 5,892,900 | A * | 4/1999 | Ginter et al. | 726/26 |
| 5,895,876 | A | 4/1999 | Moriyama et al. | 84/609 |
| 5,898,777 | A * | 4/1999 | Tycksen et al. | 380/4 |
| 5,900,608 | A | 5/1999 | Iida | 235/381 |
| 5,991,876 | A | 11/1999 | Johnson et al. | 713/200 |
| 6,009,401 | A | 12/1999 | Horstmann | 705/1 |
| 6,185,683 | B1 * | 2/2001 | Ginter et al. | 713/176 |
| 6,226,618 | B1 * | 5/2001 | Downs et al. | 705/1 |
| 6,263,313 | B1 * | 7/2001 | Milsted et al. | 705/1 |
| 6,263,318 | B1 * | 7/2001 | Kimura et al. | 705/27 |
| 6,331,865 | B1 * | 12/2001 | Sachs et al. | 345/776 |
| 6,343,280 | B2 | 1/2002 | Clark | 705/55 |
| 6,345,256 | B1 * | 2/2002 | Milsted et al. | 705/1 |
| 6,385,596 | B1 * | 5/2002 | Wiser et al. | 705/51 |

(Continued)

FOREIGN PATENT DOCUMENTS

JP 2001078266 3/2001

(Continued)

OTHER PUBLICATIONS

Martin, Robert, "Music video copyright protection: Implications for the music industry", UCLA Law Review, Dec. 1984.*

(Continued)

*Primary Examiner*—Mark Fadok
(74) *Attorney, Agent, or Firm*—Theodore M. Magee; Westman, Champlin & Kelly, P.A.

(57) ABSTRACT

In a method an owner of copyright in a copyright work uses computer equipment to transmit digital signal containing information regarding the copyright work to physically remote computer equipment of a licensing administrator. The licensing administrator uses the computer equipment thereof to receive the digital signal and to store the information contained in the digital signal in an electronic database. An applicant for a license to copy the copyright work uses computer equipment of the license applicant to transmit to the physically remote computer equipment of the licensing administrator request for a license. The licensing administrator uses the computer equipment thereof to receive the request, to process the request in conjunction with the digitally stored information regarding the copyright work in order to generate a license to copy the copyright work and to send a digital signal to the license applicant to confirm granting of the license.

30 Claims, 4 Drawing Sheets

U.S. PATENT DOCUMENTS

| | | | |
|---|---|---|---|
| 6,816,596 B1 * | 11/2004 | Peinado et al. | 380/277 |
| 6,868,403 B1 | 3/2005 | Wiser et al. | 705/51 |
| 2001/0047515 A1 | 11/2001 | Schreer | 725/20 |
| 2002/0002543 A1 | 1/2002 | Spooren et al. | 705/57 |
| 2002/0052933 A1 | 5/2002 | Leonhard et al. | 709/219 |
| 2002/0077988 A1 | 6/2002 | Sasaki et al. | 705/59 |
| 2003/0163431 A1 * | 8/2003 | Ginter et al. | 705/64 |
| 2004/0064417 A1 | 4/2004 | Stefik et al. | 705/52 |
| 2004/0220881 A1 | 11/2004 | Powell | 705/59 |

FOREIGN PATENT DOCUMENTS

| | | |
|---|---|---|
| WO | WO 98/10381 | 3/1998 |
| WO | WO 99/13398 * | 3/1999 |

OTHER PUBLICATIONS

PR NewsWire, "Sony develops copyright protection solutions for digital music content", New York, Feb. 25, 1999.*

Burgess, John, "Making their watermark on the world; digital IDs put stamp of authorship on works", The Washington Post, Sep. 9, 1997.*

U.S. Appl. No. 09/859,219, filed May 16, 2001, Martin et al.

"Sony Takes Digital System to Stores," Billboard, v111, n25, p. 1+, Jun. 19, 1999.

* cited by examiner

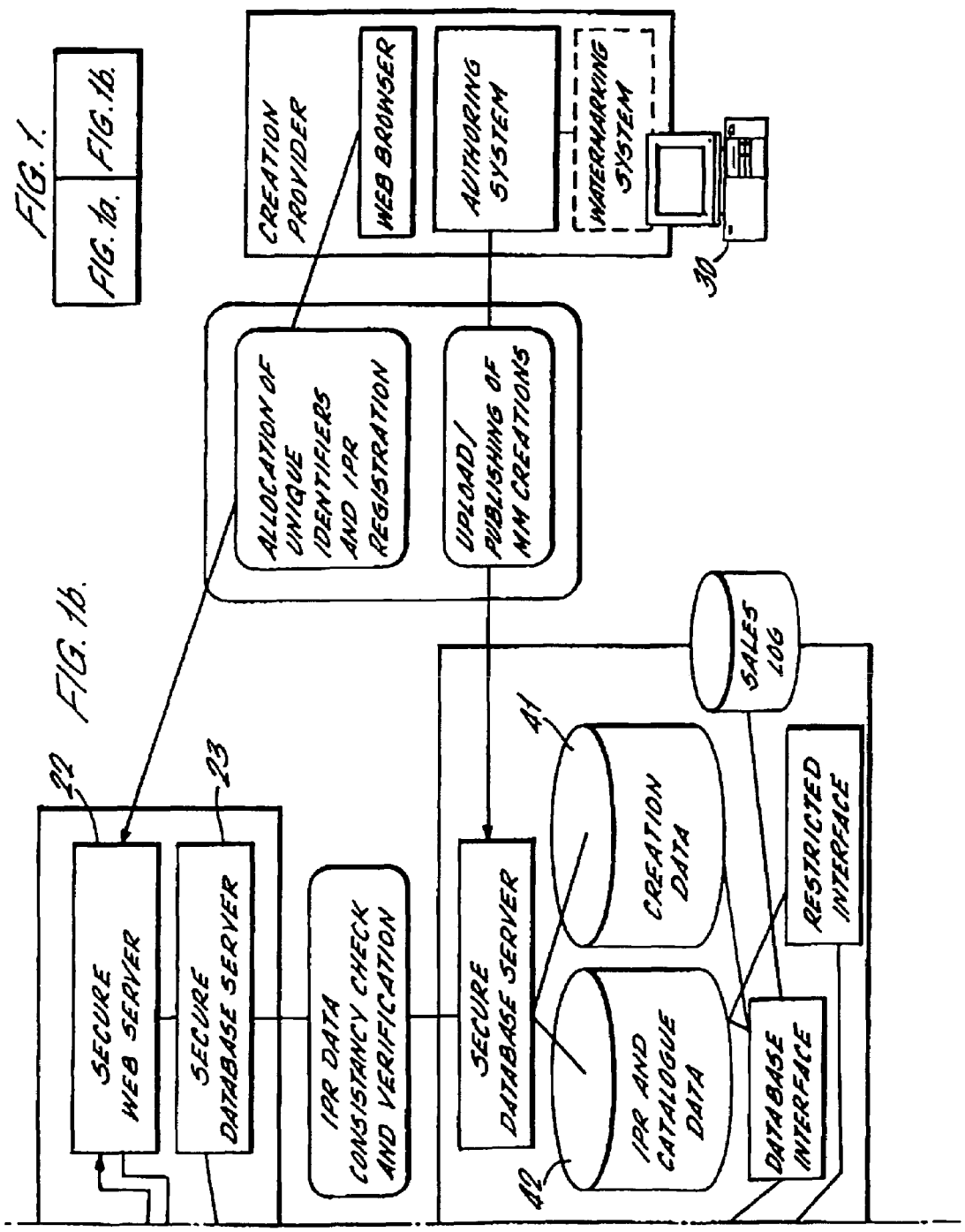

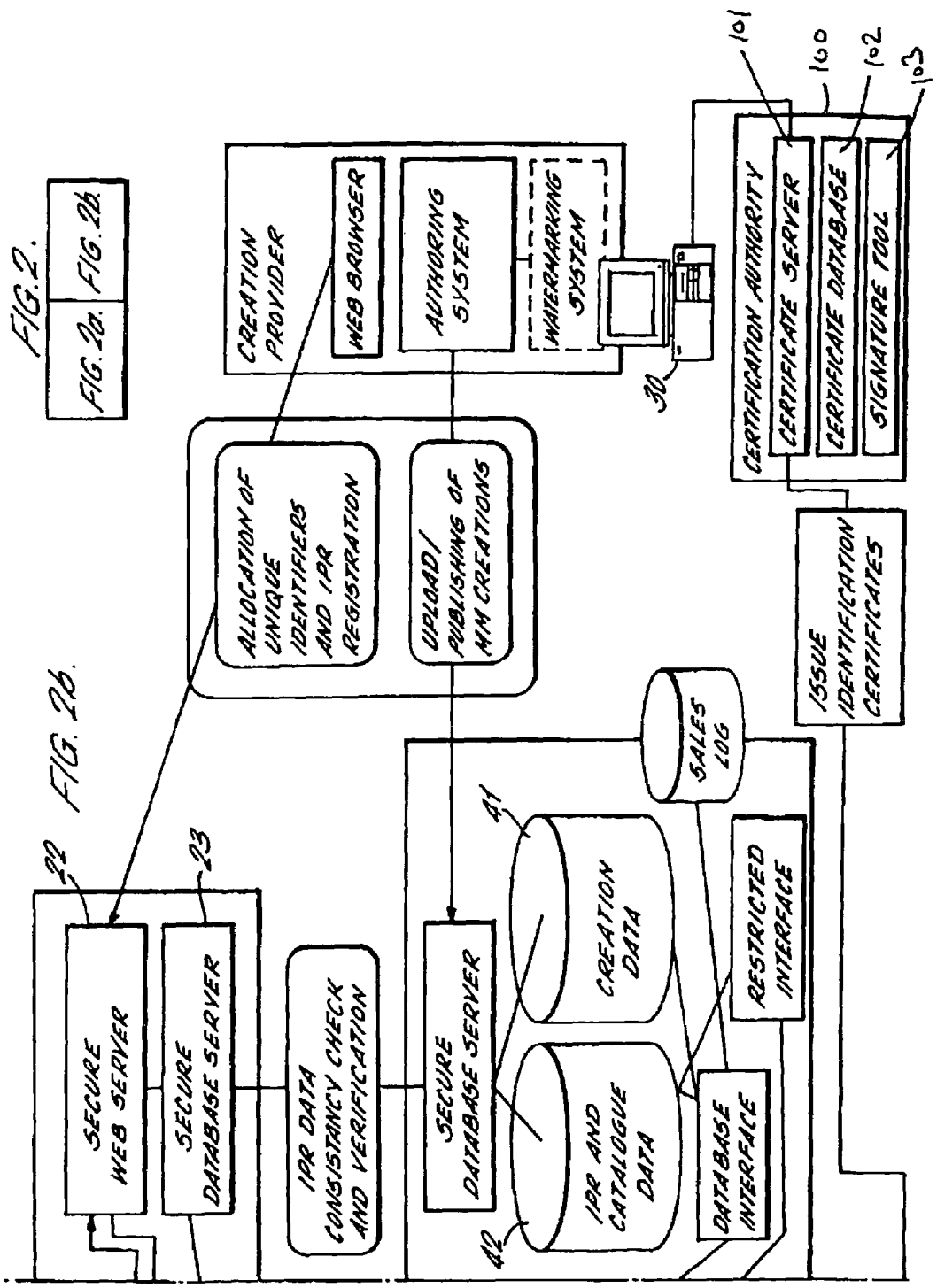

METHOD OF ADMINISTERING LICENSING OF USE OF COPYRIGHT WORKS

BACKGROUND OF THE INVENTION

The present invention relates to a method of administering the licensing of use of copyright works.

Worldwide there exist a number of Collective representation bodies (e.g. Collection Societies) who act on behalf of the owners of copyright in, for instance, musical works by granting licenses on behalf of the copyright owners and collecting royalties on behalf of the rights holders. For instance, the Mechanical Copyright Protection Society Limited licenses musical works to companies wishing to produce compact discs incorporating the musical works for sale to the general public. At present an application for a license is typically made on paper, the license application then processed using a manual system, the license granted by written communications on paper and then royalties collected.

More recently, it has become common practice for digital video and digital audio signals to be transmitted via a telecommunications network, e.g. the Internet, and this is described, for instance in U.S. Pat. No. 5,675,734. It has been realised that the advent of such electronic transfer of music could not be easily dealt with by the existing licensing system, for instance because it is likely that the low costs of producing sound recordings for sale via the Internet will lead to the advent of a greater number of smaller producers of sound recordings, all of whom must be licensed and regulated by collective representation bodies on behalf of the rights holders.

SUMMARY OF THE INVENTION

The present invention provides, in a first aspect, a novel method of administering licensing of use of copyright works comprising the steps of:

an owner of copyright in a copyright work using computer equipment to transmit via a communication network a first digital signal containing information regarding the copyright work to physically remote computer equipment of a licensing administrator;

the licensing administrator using the computer equipment thereof to receive the first digital signal sent by the copyright owner and to automatically store the information contained in the first digital signal digitally in an electronic database;

a license applicant for a license to copy the copyright work using computer equipment of the license applicant to transmit to the physically remote computer equipment of the licensing administrator via the communication network a second digital signal containing a request for a license; and the licensing administrator using the computer equipment thereof: to receive the second digital signal; to automatically process the second digital signal in conjunction with the digitally stored information regarding the copyright work in order to automatically generate a license to copy the copyright work; and to automatically send a third digital signal to the license applicant to confirm granting of the license.

The present invention provides in a second aspect a method of administering licensing of use of copyright works comprising the steps of:

an owner of copyright in a copyright work using computer equipment to transmit via a communication network a first digital signal containing information regarding the copyright work to physically remote computer equipment of a licensing administrator;

the licensing administrator using the computer equipment thereof to receive the first digital signal sent by the copyright owner and to automatically store the information contained in the first digital signal digitally in an electronic database;

a license applicant for a license to copy the copyright work using computer equipment of the license applicant to transmit to the physically remote computer equipment of the licensing administrator via the communication network a second digital signal containing a request for a license; and the licensing administrator using the computer equipment thereof: to receive the second digital signal; to automatically process the second digital signal in conjunction with the digitally stored information regarding the copyright work in order to automatically generate a license to copy the copyright work; and to automatically send a third digital signal to the license applicant to confirm granting of the license; wherein the licensing administrator stores information regarding a plurality of copyright works digitally in the electronic database thereof and the method includes the step of the license applicant interrogating the electronic database of the licensing administrator for details of the copyright works stored therein in order to select a copyright work to be licensed.

The present invention provides in a third aspect a novel method of administering licensing of use of copyright works comprising the steps of:

an owner of copyright in a copyright work using computer equipment to transmit via a communication network a first digital signal containing information regarding the copyright work to physically remote computer equipment of a licensing administrator;

the licensing administrator using the computer equipment thereof to receive the first digital signal sent by the copyright owner and to automatically store the information contained in the first digital signal digitally in an electronic database;

a license applicant for a license to copy the copyright work using computer equipment of the license applicant to transmit to the physically remote computer equipment of the licensing administrator via the communication network a second digital signal containing a request for a license; and the licensing administrator using the computer equipment thereof: to receive the second digital signal; to automatically process the second digital signal in conjunction with the digitally stored information regarding the copyright work in order to generate a license to copy the copyright work; and to automatically send a third digital signal to the license applicant to confirm granting of the license; wherein the communication network used by the copyright owner to send the first digital signal to the licensing administrator is an open telecommunications network.

The present invention provides in a fourth aspect a novel method of administering licensing of use of musical works comprising the steps of:

an owner of copyright in a musical work using computer equipment to transmit via a communication network a first digital signal containing information regarding the musical work to physically remote computer equipment of a licensing administrator;

the licensing administrator using the computer equipment thereof to receive the first digital signal sent by the copyright owner and to automatically store the information contained in the first digital signal digitally in an electronic database;

a license applicant for a license to copy the musical work using computer equipment of the license applicant to transmit to the physically remote computer equipment of the licensing administrator via the communication network a second digital signal containing a request for a license;

the licensing administrator using the computer equipment thereof to receive the second digital signal; to automatically process the second digital signal in conjunction with the digitally stored information regarding the musical work in order to automatically generate a license to copy the musical work; and to automatically send a third digital signal to the license applicant to confirm granting of the license;

the license applicant producing a sound recording for sale which incorporates the licensed musical work and which is distributed to physically remote end users digitally as digital sound files transmitted via the communication network; and the step of the license applicant incorporating in the distributed digital sound files digital code containing information regarding the license granted in respect of the musical work by the licensing administrator.

The present invention provides in a fifth aspect a novel method of administering licensing of use of copyright works comprising the steps:

a licensing administrator using computer equipment thereof to receive via a communication network from a physically remote owner of copyright in a copyright work a first digital signal containing information regarding the copyright work, computer equipment automatically storing the information in the first digital signal in an electronic database of the computer equipment of the licensing administrator;

the licensing administrator using the computer equipment thereof to receive via the communication a network from a physically remote license applicant a second digital signal containing a request for a license to use the copyright work;

the licensing administrator using the computer equipment thereof to process the second digital signal in conjunction with the stored information regarding the copyright work in order to automatically generate a license to copy the copyright work; and the licensing administrator using the computer equipment thereof to send automatically a third digital signal via the communication network to the license applicant to confirm granting of the license.

BRIEF DESCRIPTION OF THE DRAWINGS

FIGS. 1a and 1b when adjoined side-by-side as shown in FIG. 1 together give a block diagram of a computer licensing system under one embodiment of the invention; and FIGS. 2a and 2b when adjoined side-by-side as shown in FIG. 2 together give a block diagram of a computer licensing system under a second embodiment of the invention.

DETAILED DESCRIPTION OF ILLUSTRATED EMBODIMENTS

Preferred embodiments of the present invention will now be described with reference to the accompanying FIGS. 1 and 2, which schematically illustrate how two methods of the present invention will work in practice.

The owner of the copyright in a musical work will use computer equipment 10 which will have software comprising a web-browser that in one embodiment is capable of SSL2.0 Client Authentication (e.g. the Netscape Web Browser) and a payment system, e.g. Cyber Cash. Under some embodiments, the web browser gives access to a database of intellectual property rights (see later) for the registration and retrieval of information. Under these embodiments, it also enables the monitoring of sales and the requesting of automatic payments (see later). The payment system enables electronic transfer of cash and enables the copyright owner to receive royalty payments.

The copyright owner will register details of the works with a collective representation body (e.g. a Collecting Society) assuming that the owner is a member of the body, which will act as a licensing administrator. This will be done by the transfer of digital information via a communication network, typically an open telecommunications network such as the Internet. When communication is via the Internet then the web browser on the computer equipment 10 will be used to transmit digital information to a server 20 of the collective representation body (licensing administrator). This is shown by the line 11 in the FIG. 1. Server 20 will be used to store a database 21 of intellectual property rights. The rights holder in the musical work will use the web browser and computer equipment 10 to transmit to the collective representation body (licensing administrator) information for storage on the database 21 on the server 20 regarding the work. Under some embodiments of the invention this will include the title of work, the authors of the work, the arrangers of the work, the rights holders and the percentage shares of the rights holders. The server 20 will also be used to issue a unique number to the copyright work, details of which will be sent back via the communication network to the computer equipment 10 of the copyright holder.

Figure 1A:
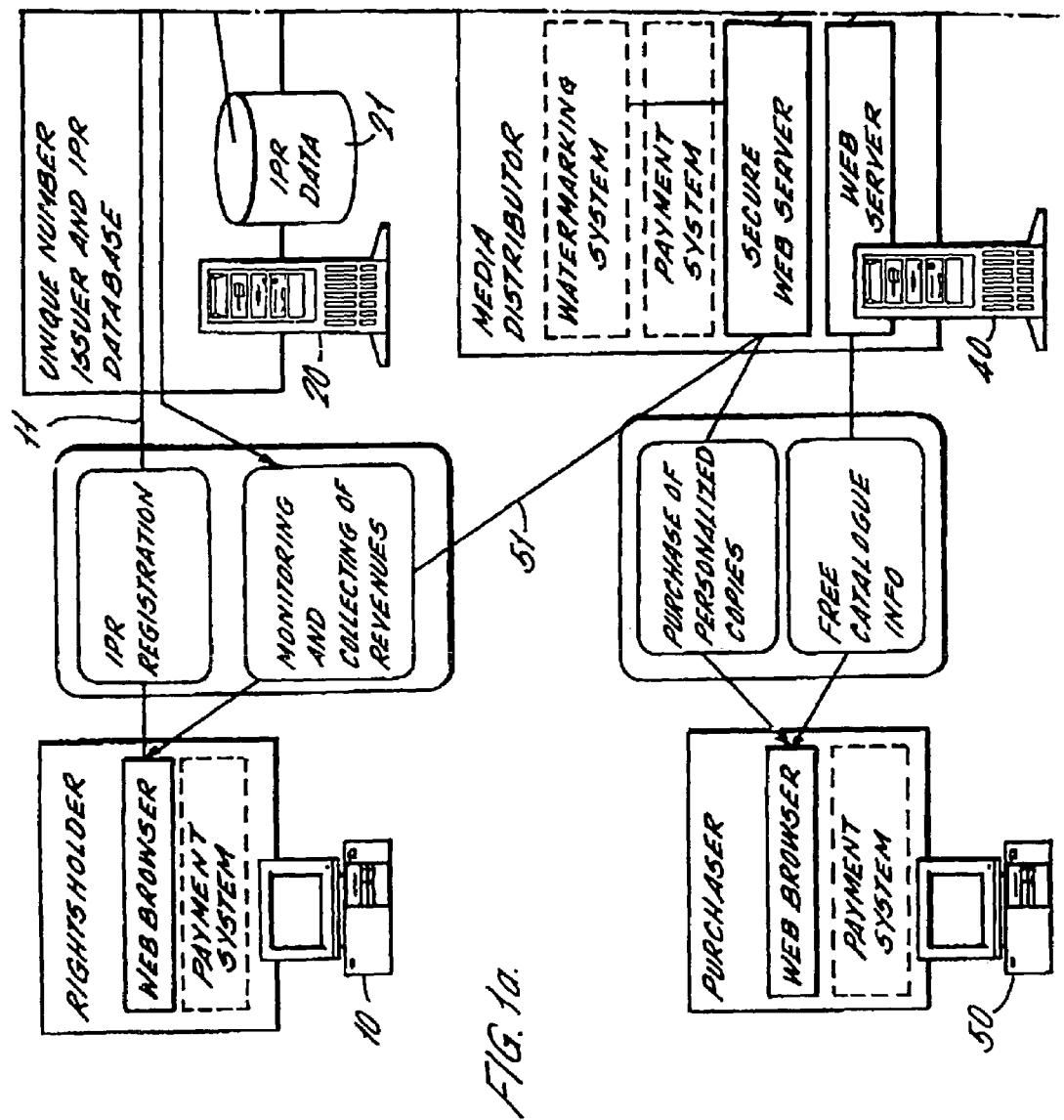
Figure 2A:
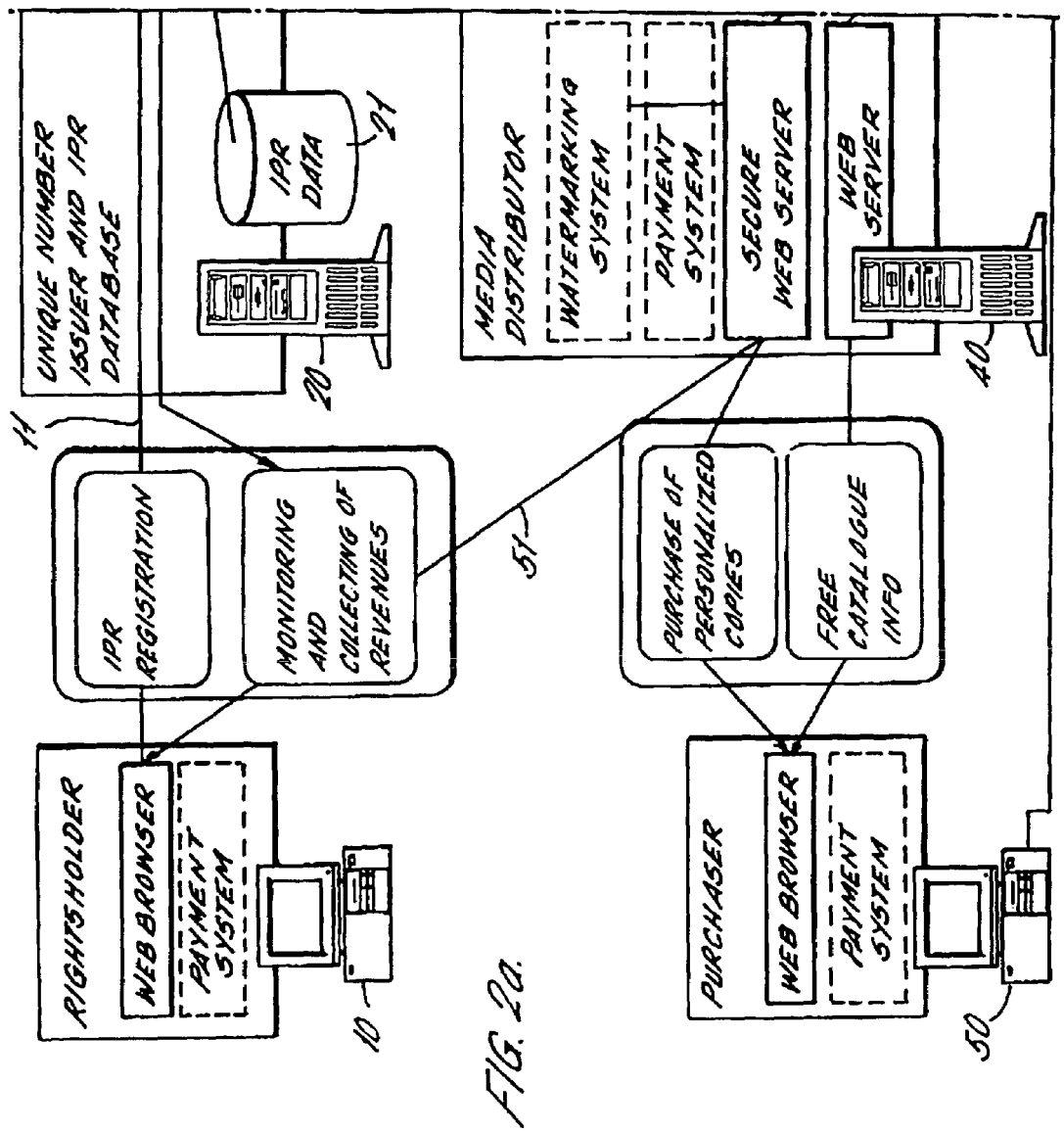

In the embodiment of FIG. 1 the server 20 is shown schematically to comprise a data base 21 of intellectual property rights information, a secure web server 22 and a secure database server 23.

The role of a creation provider will typically be the equivalent of a media (e.g. record) company of today. When the creation provider wishes to produce a new product (e.g. a sound recording) which incorporates the (e.g. musical) work of the copyright holder previously mentioned, then the creation provider will need to obtain a license from the collective representation body (licensing administrator) previously mentioned. The creation provider as a license applicant will use computer equipment 30 to request a license via a communications network, e.g. an open telecommunications network such as the Internet.

One embodiment of the computer equipment 30 includes software comprising an authoring system, a watermarking application and a web browser.

The creation provider (license applicant) will use the web browser to obtain a license from the collective representation body (licensing administrator) acting on behalf of the copyright holder. First of all, the web browser will be used to access the database 21 of intellectual property rights information, in order to identify the copyright work and obtain details of the unique identification number issued to the copyright work. Once this has been identified then the creation provider (license applicant) will submit an application for a license. Typically, a template representing a form will be available on a website maintained by the collective representation body (licensing administrator) and the web browser on the equipment 30 will be used to download the template for use as a form which is displayed on the screen of the computer equipment 30. Then the creation provider (license applicant) will complete the form. Typically, the form will require details of the name of the creation provider (license applicant) and the name or title by which the newly created sound recording created will be known. Once the application form is submitted electronically via a telecommunications network it is saved in the licensing database on the secure database server 23. At this point the license application is immediately given a unique number to identify the transaction and this is displayed by web response to the creation provider. The license application is recorded as "submitted". At this point, the initial communication between the creation provider (license applicant) and the collective representation body (licensing administrator) ends. However, the creation provider (license applicant) can use the web browser on the computer equipment 30 to, at any point, check up on the processing status of the license request.

The server 20 of the collective representation body (licensing administrator) is used to process the license application.

For each license application, the system attempts initially to identify the musical work on the database of intellectual property rights 21 by an automatic data matching procedure using the information supplied by the license application.

Where the automatic matching procedure fails and no match can be found then the computer equipment of the collective representation body (licensing administrator) will alert a member of staff for manual checking. The member of staff will click an ACTION button to confirm the successful match or enter some additional details and attempt an auto-match procedure again, or enter details of the copyright work manually and click a button to confirm correct matching.

Once the matching has been successful then the license application procedure goes on to automatically check the mandate given to the collective representation body (licensing administrator) by the copyright owner regarding the grant of licenses. If the collective representation body (licensing administrator) has the right to grant a license then the license will be granted. If the mandate does not extend to the granting of a license then the license is rejected.

Next the application process will collate information about the sound recording with information about the identified musical work stored in the database 21 of Intellectual Property Rights information. Once prepared, the relevant sound recording and copyright work data (e.g. names of performers, writers, publishers and arrangers, the titles of copyright works and sound recordings, names of copyright owners) will be copied to the licensing database on the secure database server 23. Here the copied data will be added to the existing license application and uniquely identified by the license application number.

A link will be maintained between, on the one hand, the data about the sound recording and the licensed musical work held against a license application and on the other hand, the original corresponding data entries maintained in the Intellectual Property Rights database 21. This will enable the current ownership of the musical work and sound recording to be reviewed as required. However, the ownership information about the work and recording held against the license application represents a "Snapshot" in time of the details which applied on the date when the license was issued and consequently does not change (although it is envisaged that this could be replaced by a dynamic link so that correct copyright ownership is represented at all times, perhaps with a history of the chain of title recorded against the license).

When the license application procedure has been completed then the server 20 will be used to send an e-mail to the license applicant notifying the license applicant whether or not the license application has been successful. Details of the granted license, including its terms, will be attached in a predefined file format to this e-mail. For instance in some embodiments the data will be ASCII encoded with variable length records determined each by a return and all alphabetic characters in upper case.

Under some embodiments, in order to submit applications for licensee, creation providers (license applicants) must be pre-registered with the collective representation body (licensing administrator). The pre-registered creation provider (license applicant) will be given a user name and a password. At the outset of the license application procedure the user-name and password will be checked by the server 20 and if the combination is not valid then the process will be immediately terminated.

A creation provider (license applicant) can also submit a web-based application form to apply for multiple licenses to duplicate and distribute copyright (e.g. musical) works. For such an application a single "application form" can be digitally transmitted with a datafile attachment containing details of each of the copyright works for which the applicant requires a license. The procedure which follows for processing each application will be as described above, except that the attached datafile will be opened and a license application number will be allocated to each individual application.

Any creation provider (license applicant) with an assigned user name and password will be able to use an enquiry screen to view individual license documents and to ascertain the status of any license application.

It is envisaged that the step of notifying the license results to applicants for licenses will be carried out by e-mail on a set time basis, e.g. daily, weekly etc. E-mails for a single license applicant will be collected together and forwarded together to the applicant for a license.

Although only one server 20 is shown above, it is expected that in practice, two servers will be used in parallel. Each server will hold a replica of the same database. One of the databases will be held on an external server and this database will allow Internet users to submit license applications from the Internet and to obtain information and to view the status of license applications. A production server will exist in parallel which will allow processing of the license application in a secure environment shielded by a firewall from access by users of the Internet.

It is envisaged that the database 21 will be structured in such a way that when a user submits his user-name and a password then an appropriate access control system will restrict his ability to read or modify data in a manner dependent upon his identity. For instance, a copyright holder will be restricted to alter only those records on the database which relate to his/her own copyright works.

Under some embodiments of the invention, once a creation provider (license applicant) has been granted a license to use a copyright musical work, it will use a watermarking system to embed unique identifiers discretely into the digitally created sound recordings. The digitally created sound recordings will comprise sound files and the identifiers will be incorporated in the sound files. Each sound file will then be encrypted, compressed and transferred to a remote database on a server 40 managed by a media distributor. This transfer of digital information will take place via a communications network, e.g. an open telecommunications network such as the Internet.

The watermarking system effectively applies a fingerprint to a created work which incorporates unique identifiers. This piece of digital code will be transferred along with the digitised sound recording to the media distributor. Under some embodiments, the unique identifiers include the license number issued by the collective representation body (licensing administrator) and creation identifiers such as the International Standard Recording Code (ISRC) and the International Standard Work Code (ISWC).

Under some embodiments, the media distributor has a server 40 which can receive and transmit digital information via a communication network, eg. an open telecommunications network such as the Internet. The media distributor server 100 performs the function of an on-line shopping mall for end users, i.e. the general public, to browse to select sound recordings for downloading. The media distributor will maintain a website enabling any person with Internet access to access the resources of the media distributor to select and purchase sound recordings for downloading.

The media distributor server 40 has the task of securely selling digital sound recordings over open telecommunications networks such as the Internet by ensuring that each sold copy of a created work is 'fingerprinted' with each purchaser's unique personal identification. The server 40 has three main functions which will now be described.

First of all, the server 40 serves as an upload server to enable creation providers to deposit sound recordings in a creation database (shown as 41). Usually, the sound recordings will be transmitted from the creation provider (license applicant) to the media distributor in an encrypted format.

The server 40 also maintains a database 42 of the licensed information and details of the licensed musical works and corresponding sound recordings. This data is held separately from the data which comprises the actual digitised music. The intellectual property rights and catalogue data are held at 42 in the attached illustration. Under most embodiments, all media distributors will have agreements with the collective representation body (licensing administrator) so that the intellectual property right and catalogue data received from creation providers (license applicants) and stored at 42 can be checked with the database 21 of the collective representation body (licensing administrator) to ensure consistency and to verify the fact that the creations have been licensed.

The server 40 also acts as a web server, maintaining the web site which acts as the "on-line shopping mall". The web server will comprise several functional components. First of all, the web server will act as a catalogue server and will scan the creation database 42 for available items. The server 40 will publish the information about the sound recordings available for sale in order to generate a corresponding HTML catalogue page. The generated catalogue pages will contain HTTP references (or links) to a distributor component of the web server.

Under many embodiments of the present invention, the catalogue browsing function of the catalogue server part of the web server is the only part of the web server accessible via plain HTTP. All other components of the server require a secure SSL channel and client authentication.

The distributor component of the web server handles the purchasers' request to buy a specific creation from the database. It includes a watermarking module and a payment system as integrated components.

The distributor will record sales of sound recordings in a revenue monitoring component of the web server. This record of sales can be checked by the collective representation body (licensing administrator) to ensure that the sales of musical recordings do not exceed the terms of the relevant license. Each copyright owner will also be able to review the sales of musical recordings to ensure that they have received correct royalties. The payment system on the computer equipment of the copyright owner could be used for this purpose.

Under many embodiments of the invention, a purchaser of created works will require computer equipment such as a personal computer 50 that is provided with a payment system (e.g. Cyber Cash), a web browser preferably capable of SSL 2.0 client authentication (e.g. Netscape) and optionally a watermark viewer application. The purchaser will use the web browser to access the catalogue pages on the database 42 of the media distributor's server 40. The web browser will also be used to order a chosen sound recording and to download the sound recording from the creations database 41. The payment system is required to respond to the media distributor's online payment request.

A watermarking viewer application can be used to visualize the watermarking information that is imprinted in a legally acquired created work. In the system described above, three watermarks are imprinted in a fixed sequence. First of all, the unique creation provider (license applicant) identifier code is imprinted, then the media distributor identification and then the purchaser identification. The watermark identifications, when decoded, can be displayed as HTTP hyperlinks which reference entries in the media distributor's database.

Under most embodiments, in order for a purchaser to purchase sound recordings from the media distributor, the purchaser must already be registered with the media distributor.

In a variation on the system described above (see FIG. 2), a separate certification authority 100 is introduced. The Certification Authority 100 will issue to purchasers and creation providers alike electronic certificates, being records containing a public key, the name of the key's holder and the electronic signature of a trusted Authority which is responsible for confirming the link between the public key and the holder's identity.

The Certification Authority's computer equipment will have components comprising a certificate server 101, a certificate database 102 and a signature tool 103. The certificate server 101 allows purchasers and creation providers to apply for a certificate and to download a new certificate if their request is granted.

The certificate (or public key) database 102 of the Certification Authority 100 is used to deposit new certificate requests and signed certificates alike. The computer equipment also runs a signature tool 103 which allows a human administrator to create a new certificate by signing a client's request.

Rather than require registration of each end user with the media distributor, the media distributor will download sound recordings to end users if they provide appropriate certificates from the Certification Authority 100.

It is envisaged that the Certification Authority 100 will provide a certificate which is applicable for all sorts of electronic commerce and not just the purchaser of sound recordings.

In an alternative scenario, the Certification Authority 100 could be amalgamated with a software supplier providing music playing software. Once a purchaser has registered with the Certification Authority, he would be able to download music playing software. This music playing software will allow the purchaser to purchase, download and decrypt sound files accessed on the database 41 of the media distributor. In some embodiments, the music player software includes a watermark viewer to enable a purchaser to verify the origin of the identifiers embedded in the sound files by watermarking software. It is envisaged that the software could be configured in such a way that the music player will only play music files which it recognises as properly licensed. Such an arrangement will have the advantage of imposing a standard for use by all parties to the process so that there will be a standard for encryption and for data compression.

Whilst in the above examples the collective representation body (licensing administrator) has licensed use of musical works and the method of the present invention is primarily directed at such an arrangement, it is envisaged that the method of the invention could be used to administer licensing of other copyright works, e.g. artistic works, dramatic works or literary works.

Under most embodiments, it is envisaged that the license granted by the collective representation body (licensing administrator) to the creation provider (license applicant) gives the right to produce only a limited number of copies of the copyright work. The licenses are only granted on receipt of payment of a license fee to the collective representation body (licensing administrator). The license fee can be paid by electronic funds transfer. In some embodiments the computer equipment 20 of the collective representation body (licensing administrator) will automatically calculate a license fee from a request of a license applicant which will include a request to issue a certain number of copies. The collective representation body (licensing administrator) will transfer a portion of received funds to the copyright owner. Co-operation between the collective representation body (licensing administrator) and the distributor, e.g. by the transfer of digital information, will enable monitoring of the numbers of recordings sold to ensure that the licensed number is not exceeded. Indeed, it is envisaged also (as mentioned above) that a link 51 between the copyright owner and the server of the media distribution will enable the copyright owner to check sales of the licensed musical work.

Payment for products sold in most embodiments mentioned above will pass by electronic funds transfer from the media distributor to the creation providers (license applicants). The creation providers (license applicants) would pass to the performing artists (creators) any payments due to them under existing agreements.

Whilst above the media distributor is used to issue for instance sound recordings to end users and the media distributor is separate and distinct from the creation provider (license applicant) in some embodiments the functions of the media distributor and creation provider (license applicant) will be performed by the same company using the same computer equipment.

The invention claimed is:

1. A method of administering licensing of use of copyright works comprising the steps of:
   a plurality of owners of copyright in a plurality of musical works using computer equipment to transmit via a communication network a plurality of first digital signals containing information regarding the musical works to physically remote computer equipment of a licensing administrator, the licensing administrator being independent of the owners of copyright in the plurality of musical works;
   the licensing administrator using the computer equipment thereof to receive the first digital signals sent by the copyright owners and to automatically store the information contained in the first digital signals digitally in an electronic database;
   a plurality of creation providers producing sound recordings incorporating the musical works;
   when each creation provider wishes to produce a sound recording including one of the musical works and needs a license from the owner of copyright in the musical work then prior to the production for sale of the sound recordings the creation provider applies to the licensing administrator for a license to copy the musical work using computer equipment of the creation provider to transmit to the physically remote computer equipment of the licensing administrator via the communication network a second digital signal containing a request for a license;
   the licensing administrator using the computer equipment thereof: to receive the second digital signal; to automatically process the second digital signal in conjunction with the digitally stored information regarding the musical work in order to automatically generate a license to copy the musical work; and to automatically send a third digital signal to the creation provider to confirm granting of the license; wherein:
   the licensing administrator stores information regarding the plurality of musical works digitally in the electronic database thereof and the method includes the step of each creation provider interrogating the electronic database of the licensing administrator for details of the musical works stored therein in order to select the musical work to be licensed;
   the creation provider produces the sound recording for sale which incorporates the licensed musical work and which is distributed to physically remote end users digitally as digital sound files transmitted via the communication network, the sound recording comprising a new sound recording of the musical work that does not include sound recordings of the musical work produced before the new sound recording was produced;
   the creation provider incorporates in the distributed digital sound files digital code containing information regarding the license granted in respect of the musical work by the licensing administrator;
   the licensing administrator is a collecting society which represents the plurality of owners of copyright in the musical works and the licensing administrator is independent of all of the creation providers and issues licenses to the creation providers on behalf of the owners of copyright in the musical works; and
   the third digital signal sent by the licensing administrator incorporates details of the granted license, including the license terms, without incorporating the licensed musical work.

2. A method as claimed in claim 1 in which the creation provider transmits the sound recording incorporating the licensed work as a digital sound file via the communication network to physically remote computer equipment of a distributor and the distributor uses the computer equipment thereof to transmit copies of the sound recording to physically remote end users as digital sound files sent via the communication network.

3. A method as claimed in claim 2 which includes the step of the distributor connecting the computer equipment thereof with the computer equipment of the licensing administrator to exchange digital information to verify that the sound recording received by the distributor from the creation provider has been licensed by the licensing administrator.

4. A method as claimed in claim 3 wherein the distributor receives sound recordings from a plurality of different creation providers and stores the sound recordings in an electronic database maintained on the computer equipment of the distributor and wherein end users can access the database of the distributor and browse the database to select sound recordings to download from the database.

5. A method as claimed in claim 4 in which the distributor connects the computer equipment thereof with the computer equipment of the licensing administrator to exchange digital information to verify that the plurality of sound recordings stored in the electronic database of the distributor have been licensed by the licensing administrator.

6. A method as claimed in claim 4 in which the distributor transmits the sound recordings to an end user only after receiving payment from the end user.

7. A method as claimed in claim 6 wherein the payment is made by the end user by transferring information digitally via the communication network to the distributor.

8. A method as claimed in claim 7 in which each end user must register on a database of end users maintained by the distributor and receive from the distributor an assigned identity code before the end user is permitted by the distributor to download a sound recording from the database maintained by the distributor.

9. A method as claimed in claim 6 in which the distributor includes in the digital sound files sent to the end users code recording details of licenses granted in respect of musical works.

10. A method as claimed in claim 7 in which the distributor includes in the digital sound files sent to the end users code recording details of licenses granted in respect of musical works.

11. A method as claimed in claim 8 in which the distributor includes in the digital files sent to the end users code recording details of licenses granted in respect of musical works.

12. A method as claimed in claim 6 in which the distributor includes in the digital sound files sent to the end users code recording details of the identity of the creation providers who produce the sound recordings sent by the digital sound files.

13. A method as claimed in claim 7 in which the distributor includes in the digital sound files sent to the end users code recording details of the identity of the creation providers who produced the sound recordings sent by the digital sound files.

14. A method as claimed in claim 8 in which the distributor includes in the digital sound files sent to the end users code recording details of the identity of the creation providers who produce the sound recordings sent by the digital sound files.

15. A method as claimed in claim 9 in which the distributor includes in the digital sound files sent to the end users code recording details of the identity of the creation provider who produces the sound recording sent by the digital sound files.

16. A method as claimed in claim 8 in which the distributor includes in each digital sound file sent to the end user code recording the identity of the end user downloading the digital sound file.

17. A method as claimed in claim 1 in which the communication network used by the copyright owner to send the first digital signal to the licensing administrator is an open telecommunications network.

18. A method as claimed in claim 17 in which the open telecommunications network is the Internet.

19. A method as claimed in claim 18 in which the licensing administrator maintains a website on the Internet on which a template is available which assists the copyright owner in assembling information regarding the copyright work sufficient for the purposes of the licensing administrator, the copyright owner using web browser software on the computer equipment thereof to access the website of the licensing administrator.

20. A method as claimed in claim 1 in which the creation provider transmits the second digital signal to the licensing administrator via an open telecommunications network.

21. A method as claimed in claim 20 wherein the open telecommunications network used to transmit the second digital signal is the Internet and the creation provider uses web browser software on the computer equipment thereof to send the second digital signal via the Internet.

22. A method as claimed in claim 2 wherein the distributor transmits the copies of the sound recordings via an open telecommunications network.

23. A method as claimed in claim 22 wherein the open telecommunications network used to transmit copies of the sound recordings is the Internet.

24. A method as claimed in claim 4 wherein the distributor maintains a website on the Internet and the website is accessible by the end users who use web browser software on their computer equipment and the facilities provided by the website to browse sound recordings available for downloading.

25. A method as claimed in claim 1 in which the licensing administrator grants a license to the creation provider to produce only a specified number of copies of the copyright work.

26. A method as claimed in claim 25 in which the creation provider pays a license fee to the licensing administrator by transferring information digitally using payment software via the communication network to the licensing administrator.

27. A method as claimed in claim 26 in which the licensing administrator transfers a portion of the license fee received thereby to the copyright owner using payment software to transfer information digitally to the copyright holder via the communication network.

28. A method as claimed in claim 2 in which a certifying authority certifies the identity of the end users and an end user must provide details of a certificate granted by the certifying authority before receiving a requested sound recording, the end user sending details of the certificate by way of a digital signal sent via the communication network.

29. A method as claimed in claim 2 wherein the end users require music player software to be able to play received digital sound files and the digital sound files are playable only by music player software which is able to read the code recording details of the granted license.

30. A method as claimed in claim 29 wherein the music player software will not play digital sound files which do not incorporate code indicating that the digital sound files are correctly licensed.

* * * * *